United States Patent [19]
Bissey et al.

[11] Patent Number: 5,386,954
[45] Date of Patent: Feb. 7, 1995

[54] AIRCRAFT FLIGHT PROCESS WHEN MAINTAINING THE SPEED BY ACTION ON THE ELEVATOR

[75] Inventors: Bernard Bissey, Blagnac; André Cazenave, Brax, both of France

[73] Assignee: Aerospatiale Societe Nationale Industrielle, Paris Cedex, France

[21] Appl. No.: 23,208

[22] Filed: Feb. 25, 1993

[30] Foreign Application Priority Data

Feb. 28, 1992 [FR] France .................. 92 02388

[51] Int. Cl.⁶ .............. B64C 13/16; G05D 1/08
[52] U.S. Cl. .................... 244/181; 244/76 R; 244/182; 244/188; 244/195
[58] Field of Search ............ 244/76 R, 76 B, 181, 244/182, 188, 191, 194, 195

[56] References Cited

U.S. PATENT DOCUMENTS

| | | | |
|---|---|---|---|
| 2,987,275 | 6/1961 | Moncrieff-Yeates et al. | 244/191 |
| 3,522,729 | 8/1970 | Miller . | |
| 3,586,268 | 6/1971 | Melvin | 244/181 |
| 3,614,036 | 10/1971 | Foster . | |
| 3,908,934 | 9/1975 | Schloeman . | |
| 3,989,208 | 11/1976 | Lambregts | 244/182 |
| 4,471,439 | 9/1984 | Robbins et al. | 244/182 |
| 4,536,843 | 8/1985 | Lambregts | 244/181 |
| 4,569,021 | 2/1986 | Larson et al. | 244/188 |
| 4,709,336 | 11/1987 | Zweifel | 364/433 |
| 5,079,711 | 1/1992 | Lambregts | 364/434 |

FOREIGN PATENT DOCUMENTS

| | | |
|---|---|---|
| 0082661 | 6/1983 | European Pat. Off. . |
| 1506058 | 4/1972 | Germany . |
| 3420076 | 12/1985 | Germany ............... 244/182 |

Primary Examiner—Michael S. Huppert
Assistant Examiner—Virna Lissi Ansley
Attorney, Agent, or Firm—Michael N. Meller

[57] ABSTRACT

Process for flying an aircraft in the "elevator speed maintenance mode" during altitude changes, in which for acquiring and/or maintaining a nominal speed it is supplied to the flight computer at the same time as the instantaneous speed of the aircraft, said computer producing the elevator control instruction, characterized in that a nominal speed is also simultaneously transmitted in continuous manner to the automatic thrust control member of the engines and in that the process is performed during two successive sequences, namely:

a first sequence during which the elevator only receives a nose up instruction (on climbing) or a dive instruction (on descending) and the engines move to full thrust in the first case or to idling speed in the second and a second sequence, following the first, during which the real nominal speed is supplied to the elevator instruction computer and said same nominal speed increased (on climbing) or decreased (on descending) by a margin is supplied to the automatic thrust control member.

7 Claims, 1 Drawing Sheet

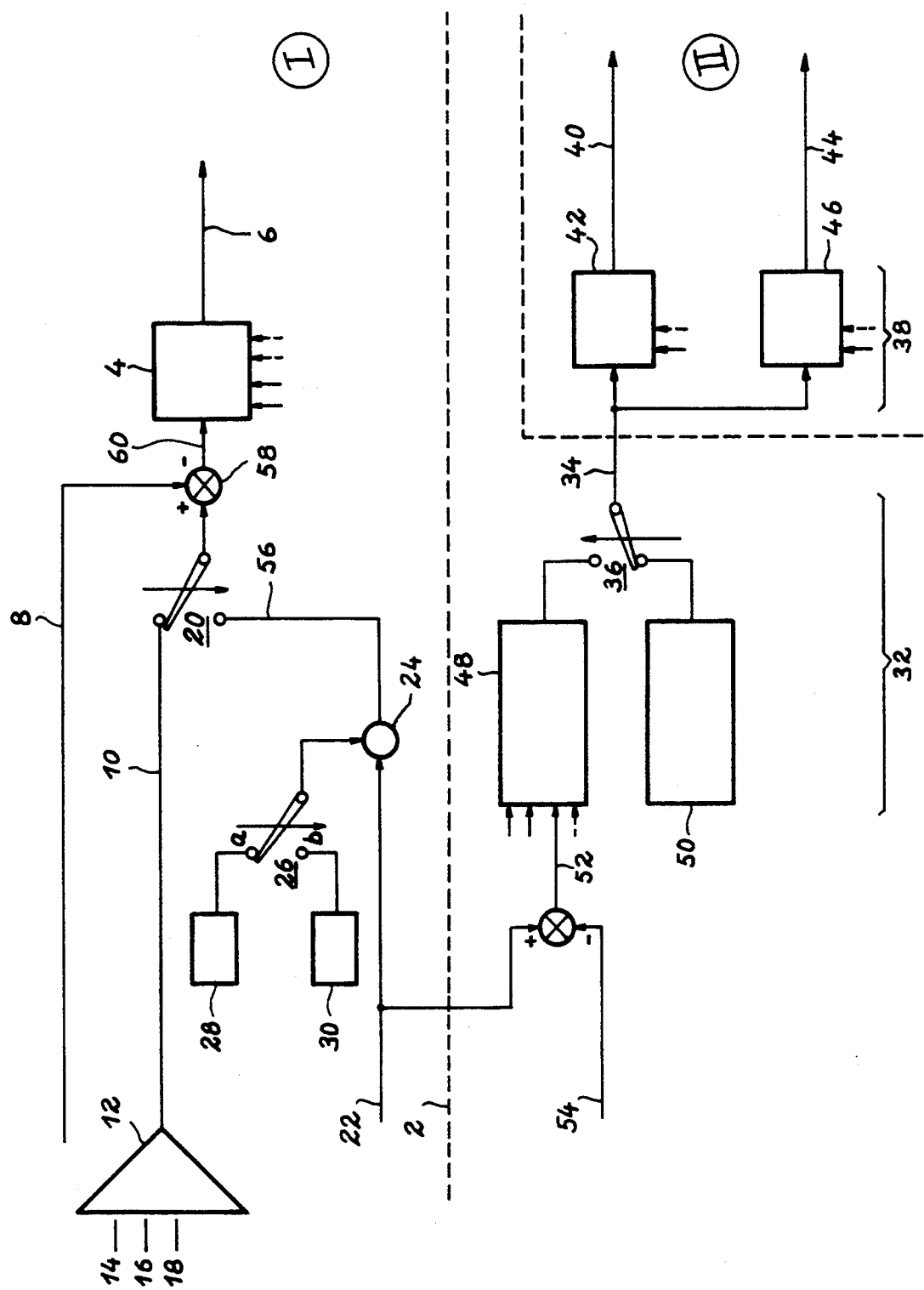

AIRCRAFT FLIGHT PROCESS WHEN MAINTAINING THE SPEED BY ACTION ON THE ELEVATOR

BACKGROUND

The present invention relates to the piloting or flight of aircraft and concerns a flight process "by maintaining the speed by action on the elevator". It solely relates to the flying of aircraft during an altitude change, e.g. when cruising or during climbing or descending phases. During altitude changes it is directed at acquiring and/or maintaining a nominal speed, which is necessary and important in view of the fundamental function of the speed which, for safety reasons, must always be equal to or between the minimum speed authorized and the maximum speed authorized by the designer.

It applies both in the case of automatic piloting without any intervention on the part of the crew and to manual piloting by the crew using the control column and following the lines or bars of the flight director. It is pointed out that the flight director is an instrument essential to piloting and which displays on the instrument panel with the aid of two perpendicular and mobile bars on a dial, one horizontal relating to the vertical guidance and the other vertical relating to the lateral guidance, the variation between the real trajectory or path of the aircraft and the ideal trajectory or path calculated on the basis of flight instructions. Piloting, whether automatic or manual, consists of acting on the controls of the apparatus in order to permanently maintain the intersection point of these two bars or lines in the centre of the dial. The present invention only relates to the vertical guidance and therefore only the horizontal bar is to be taken into consideration within the scope of the present process.

In the present text, generally no details are given of whether it is automatic or manual piloting, because the process according to the invention functions equally well in both cases. Thus, the computer producing the piloting or flight rule or law on the basis of the flight parameters can transmit instructions directly to the elevator (autopilot) and to the flight director (manual flight), which places the bars at the location corresponding to the path to be followed, so that in turn the pilot acts on the controls so as to place and maintain the intersection point of the bars in the centre of the dial.

It is also pointed out that the elevator, located to the rear of the apparatus and whose position is controlled by the control column or the power member of the autopilot, makes it possible to regulate the path of the aircraft with respect to a horizontal plane. It evolves between so-called "nose up" positions bringing about an aircraft climb and so-called "dive" positions, bringing about the descent of the aircraft. It therefore plays an essential part in the process according to the invention during which, by definition, the aircraft changes altitude.

After giving these basic notions, consideration will now be given to the following points. In order to modify the aircraft speed, the automatic or manual pilot has two essential parameters:

a) the thrust of the engines, which is the only internal energy source of the aircraft;
b) exchanges between the kinetic energy and the potential energy of the aircraft.

Thus, the pilot can act on the speed both by modifying the thrust of the engines and by modifying, with the aid of the control column the position of the elevator without modifying the engine thrust.

In the hitherto used flight or piloting processes, the maintaining of a nominal speed takes place with the aid of two different methods, which are exclusive of one another, i.e. which are never used together:

either the thrust of the engines is constant (in general at maximum power if the aircraft climbs and at idling speed if the aircraft descends) and the maintenance of the nominal speed takes place by action on the elevator, so that the aircraft takes the optimum gradient descending or climbing path;

or the nominal speed is obtained by the continuous regulation of the engine thrust, the automatic or manual pilot through the flight regulator only regulating the nominal magnitudes other than the speed.

In the hitherto used piloting methods, the maintaining of a nominal speed during altitude changes takes place according to the first of the two aforementioned methods and namely by the action on the elevator.

In these known procedures, the maintaining of the nominal speed, both with autopilot or manual pilot with the flight director by controlling the aircraft trajectory, takes place by using the elevator.

On the basis of these informations supplied by onboard transducers (speed, gradient, acceleration, etc.) and the value of the nominal speed to be reached, the computer applies the piloting rule and produces either the autopilot elevator instruction, or the displacement instruction for the horizontal bar of the flight director which the pilot will centre on the dial of the instrument panel by varying the aircraft attitude by means of the control column and the elevator.

The use of this piloting rule makes it possible to carry out the following. If the nominal altitude displayed by the crew exceeds the actual altitude of the aircraft it is necessary to climb and the engine thrust is generally brought to a maximum and the piloting rule makes it possible to arrive at and maintain the nominal speed. If the nominal altitude is below the actual altitude of the aircraft, it is necessary to descend and generally thrust is reduced to idling power and the piloting rule acquires and maintains the nominal speed, as when climbing, by controlling the optimum descent gradient.

It can be seen that in this operating procedure there is no automatic regulation of the thrust as a function of the speed to be maintained. The automatic thrust regulation takes place on an "all or nothing" basis. It is the bringing to maximum or minimum thrust which brings about the response of the aircraft and the piloting rule merely makes the aircraft speed dependent on the nominal speed.

Although this piloting or flight procedure has been used up to now, it suffers from a certain number of disadvantages which will be described hereinafter and which require very special attention, particularly when flying in strong turbulence. In all flight phases, but particularly near to the ground (initial climb and approach), the speed of the aircraft is a very important parameter which the crew must be very carefully monitored.

When the speed is being maintained by the elevator, either in the case of autopilot or manual pilot with a flight director, the thrust is fixed and is generally idling during the descent phase. Any atmospheric disturbance (gust of wind) or when the flight director instructions are not carefully respected by the pilot, can then lead to the aircraft speed dropping below the nominal speed. This which can have dangerous consequences if the nominal speed is the minimum authorized speed, because the recovery of the necessary speed can only be made good in this case by increasing the descent gradient, or by wave-off with a relatively long engine response time.

Conversely, in the case of climbing at maximum speed, the thrust is generally fixed and at a maximum, so that for the same reasons as described hereinbefore (turbulence, not following the bars) can lead to the aircraft speed exceeding the maximum authorized speed.

SUMMARY

The present invention is directed at a process for flying in the elevator speed maintenance mode making it possible in a simple manner to overcome the disadvantages of the prior art referred to hereinbefore.

The invention therefore relates to a process for flying an aircraft, in the "elevator speed maintenance mode" during altitude changes, in which for acquiring and/or maintaining a nominal speed it is supplied to the flight computer at the same time as the instantaneous speed of the aircraft, said computer producing the elevator control instruction, characterized in that a nominal speed is also simultaneously transmitted in continuous manner to the automatic thrust control member of the engines and in that the process is performed during two successive sequences, namely:
  a first sequence during which the elevator only receives an instruction to put the nose up (on climbing) or dive (on descending) and priority is given to said elevator by transmitting to the engine automatic thrust control member a nominal speed equal to or higher than the instantaneous speed of the aircraft on climbing, or equal to or below the instantaneous speed of the aircraft on descending, so that said thrust continuously increases on climbing or continuously decreases on descending until the maximum thrust is obtained in the first case and the minimum thrust in the second and
  a second sequence, following the first, during which the real nominal speed is supplied to the elevator instruction computer and said same nominal speed, increased (when climbing) or decreased (when descending) by a margin is supplied to the automatic thrust control member.

The essential originality of the process according to the invention is that the action takes place simultaneously on the elevator and on the engine thrust, but with the precautions resulting from the performance of the speed acquisition and maintenance phase in two consecutive sequences. During the first sequence, the nominal speed supplied to the engine thrust instruction computer is a speed chosen in such a way that the thrust can never decrease during a rise or increase during a descent. This is in particular obtained as a result of the fact that during speed and altitude changes, there is temporary masking with respect to said engine thrust of the new nominal speed chosen at the time of cutting-in the piloting mode if the latter has as its effect the decrease of the thrust on climbing or the increase of the thrust on descending. Thus, the reaction of the engine thrust could be too fast for the display of this new nominal speed and could lead to the quasi-instantaneous evolution of the engine thrust in a direction opposite to the philosophy of the mode, i.e. a decrease on climbing or an increase on descending. However, if, according to the invention, it is decided to display for the engine thrust during the first sequence a speed intermediate between the nominal speed, the aircraft instantaneous speed and the authorized maximum speed on climbing, or the authorized minimum speed on descending, it is possible to ensure that there is no transient decrease of the thrust on climbing or transient increase of thrust on descending, i.e. during the first sequence the thrust of the engines is a continuously increasing function of the time up to its maximum if the aircraft climbs and a continuously decreasing function of the time to its minimum if the aircraft is descending.

During the second sequence, the thrust of the engines, which has reached its maximum value or minimum value is maintained there and the known piloting mode defined hereinbefore is obtained (piloting or flight solely by the elevator with a fixed engine thrust), except that the real nominal speed supplied to the engine thrust instruction computer is increased (when climbing) or decreased (when descending) by a margin so as to avoid, in the case of slight turbulence, a variation of the engine running conditions which would lead either to a thrust reduction on climbing, or a thrust increase on descending.

These precautions make it possible to maintain the maximum or minimum engine thrust during the second sequence, even in the case of unfavourable atmospheric conditions or a relatively slack, but still admissible, operation of the indications of the flight director bars.

Moreover, according to a secondary, but important feature of the invention, it is advantageous for maintaining full thrust on climbing or idling speed on descending, to increase the authority of the control function of the engine thrust instruction by increasing the reaction gain of the control, in the case where the aircraft speed drops below the nominal speed on climbing, or exceeds the nominal speed on descending.

Compared with the prior art elevator speed maintenance mode piloting process, the process according to the invention offers the following advantages.

The acquisition or maintenance of the nominal speed takes place simultaneously through the elevator and the automatic regulation of the engine thrust with priority for the elevator.

The crew knows that no matter what the piloting method (automatic or manual via the flight director), the automatic regulation of the thrust will always be active, no matter whether or not the flight director bars are followed, the invention ensures that the nominal speed is maintained within the performance limits of the aircraft engines.

In both automatic pilot and manual pilot through the flight director with well followed bars, the invention makes it possible to maintain the same performance levels as with the prior art procedures.

The invention also permits during flights at a nominal speed equal to the maximum or minimum operational speed, to aid the automatic piloting by reducing or increasing thrust in the case of atmospheric disturbances or wind making the aircraft pass outside the authorized flight envelope.

The invention is described in greater detail with reference to the following diagram showing the piloting or flight process according to the invention, as well as a practical embodiment of the process. The single drawing is given in an illustrative and non-limitative manner and very diagrammatically shows all the associated means making it possible, on board an aircraft, to carry out the flight process according to the invention.

DESCRIPTION OF THE DRAWING

In the FIGURE a horizontal, dotted line 2 subdivides two separate areas, the first I, positioned above the line 2, relates solely to the control of the engine thrust of an aircraft, whereas the second II located below the line 2 relates to the production and processing of elevator instructions and instructions given to the flight director bars.

DESCRIPTION

In the area I, of the FIGURE there is essentially the engine thrust instruction production computer 4, said instruction being supplied on the line 6 to the gas intake control. This computer 4 produces with the aid of the transfer function contained therein, the said engine thrust instruction on the basis of the instantaneous speed of the aircraft supplied to it by the line 8 from transducers on board the aircraft and the nominal speed chosen during the first operating sequence of the process according to the invention, said nominal speed being introduced by the line 10 after being produced by the choice element 12 having three inputs 14, 16 and 18. The input 14 receives the instantaneous value of the aircraft speed, the input 16 receives the permitted maximum speed on climbing or the permitted minimum speed on descending and the input 18 the real nominal speed. As a function of the flight parameters and the program to be performed, the element 12 can determine, according to the rules defined hereinbefore, the nominal speed supplied by the line 10 and the switch 20 to the computer 4 during the first sequence. Moreover, the computer 4 also receives other informations on the state of the flight and the aircraft, such as e.g. the gradient with respect to the ground and the instantaneous weight of the aircraft which evolves as a function of the fuel consumption. For the understanding of the examples given hereinafter it is useful to know that the value of the gradient relative to the ground permanently introduced into the computer 4 has the effect of controlling an engine thrust increase if the gradient is upwards and an engine thrust decrease if the gradient is downwards.

In the area I there is also an input 22 for the real nominal speed and a mixer 24 making it possible, through a two-position switch 26, to supply on the said line 22 the margin referred to hereinbefore with respect to the real nominal speed. To this end, the switch 26 has two positions, namely a position A, shown in the drawing and that used when the aircraft is climbing and a position B used when the aircraft is descending. In the position A, a complementary speed of +5 knots is injected on the line 22 by the mixer 24 from the generator 28. This is carried out during the control of a rising gradient of the aircraft. However, if the aircraft is controlled by its elevator in order to adopt a descending gradient, the switch 26 switches in the direction of the arrow and assumes its second stable position B and then the generator 30 adds to the nominal speed the value equal to −5 knots (order of magnitude), transmitted to the computer 4 by means of the switch 20, which has previously been switched in the direction of the arrow.

The area II essentially contains the piloting rule computer and which is constituted by two loops. The first is a large or major loop 32, which is responsible for the piloting rule among the altitude acquisition, altitude maintenance and speed maintenance modes 48. All the components of the major loop 32 are responsible for transferring on the line 34 through the switch 36 the aircraft longitudinal attitude variation law or rule. The small or minor loop 38 has that part of the computer ensuring the transformation of the preceding longitudinal attitude variation, either into an elevator instruction on the line 40 by means of the autopilot transfer function 42, or into a position instruction of the flight director bars on the line 44 via the flight director instruction transfer function 46. As explained hereinbefore, the choice of the piloting of the elevator, either automatically by instructions received from the line 40, or manually following the instructions received from the line 44 to the flight director bars does not influence the performance of the process according to the invention which remains the same both in the case of autopilot and in the case of manual piloting with the aid of the flight director.

In the major loop 32, FIG. 1 simply shows the circuits responsible for producing the piloting law whilst maintaining speed, because the process according to the invention only relates to this operating mode. Among the elements of the major loop 32 are shown the circuit 48 for producing the piloting law in the second sequence and the initial polarization circuit 50 which, during the cutting-in of the first process sequence makes it possible to supply on the line 34 a nose up instruction if the aircraft must climb or a dive instruction if it has to descend.

To understand the operation of the equipment of FIG. 1, reference is made to the fact that the process takes place in two sequences, namely a first sequence corresponding to the acquisition of a maximum or minimum engine thrust and during which the elevator makes the aircraft trajectory change, said first sequence taking place when the switches 20 and 36, which function simultaneously, are in their inoperative position R. When the engine thrust has reached its maximum or minimum value the second operating sequence takes place and its appearance is triggered by the simultaneous switching of the switches 20 and 36, which switch in the direction of the arrows shown in the drawing.

The diagrammatic description of the components permitting the operation of the piloting or flight process according to the invention has now been given, so that now a description will be provided of the main stages of an exemplified performance thereof.

When the pilot engages the "elevator operation speed maintenance mode", the initial polarization circuit 50 supplies on the line 34 an instruction to lift the nose if the aircraft has to rise or climb or a dive instruction if the aircraft has to descend. The switches 36 and 20 remain in the inoperative state and the aforementioned instruction is passed by the line 34 either to the transfer function 42 and from there by the line 40 to the elevator in the case of autopilot, or across the transfer function 46 and the line 44 in the form of an instruction to the flight director bars which the pilot then interprets in the conventional manner. At this stage of the process, the choice element 12 chooses a nominal speed in the manner explained hereinbefore and supplies it via the thrust transfer function computer 4 on the line 6 to give the engine thrust instruction. According to the invention, the nominal speed chosen by the element 12 is such that it is always below the maximum permitted speed for the aircraft or above the minimum permitted speed, but so that the engine thrust always rises when climbing and in particular in the case of a climb with deceleration and always decreases during a descent, particularly in the case of a descent accompanied by a speed increase. To solve this problem, the chosen nominal speed is intermediate between the nominal speed, the aircraft speed and the maximum authorized speed on rising and the minimum authorized speed on descending.

The initial polarization supplied by the circuit 50 on the line 34 permits the variation of the engine towards full power if the aircraft climbs or to idling power on descending, so that the nose is raised or vice versa. When one of the aforementioned limits is reached, the first sequence of the process is ended and the switches 20 and 36 switch with respect to the position in which they are shown in the drawing and the second sequence of the process commences.

For automatic piloting on the line 40 or for the flight director on the line 44, it is now the maintaining of the piloting law in the speed maintenance or acquisition state supplied by the circuit 48 which comes into play. The circuit 48 receives on its input 52 a differential speed indication between the nominal speed injected on the line 22 and the instantaneous speed of the aircraft injected on the line 54. The piloting law supplied by the computer 48, which at the same time as the speed variation on the line 52 receives other informations concerning the state of the flight, makes it possible to obtain on the lines 40 or 44 the automatic or manual piloting instructions leading to a satisfactory aircraft trajectory.

During this second process sequence, the engine thrust on the line 6 is calculated by means of the computer 4 on the basis of the real nominal speed displayed on the line 22 by the crew with on this occasion a +5 knot correction from the circuit 28 if the aircraft is climbing and −5 knots from the circuit 30 if the aircraft is descending. This nominal speed on the line 56 is transmitted to the differential circuit 58, which at the same time receives by the line 8 the instantaneous speed of the aircraft. It is the difference of these two speeds which is supplied by the line 60 to the computer 4 concerning the engine power instruction 6.

Thus, during this second sequence, there is the conventional elevator speed maintenance piloting mode, with the fundamental difference that the engine thrust is simultaneously active and the nominal speed which it receives has the above-described safety margin.

A description will now be given of an exemplified embodiment of the process when piloting an aircraft having to pass from an altitude of 10000 to 30000 feet. It will be assumed that the aircraft is in horizontal flight at 10000 feet and a speed of 250 knots. An instruction is given to the pilot to climb to 30000 feet with a nominal speed of 200 knots. The pilot chooses to do this by speed maintenance acting on the elevator. Therefore he selects on the instrument panel this piloting mode, which assumes a sensitization of the computers 4, 48, 50, 42 and 46 and a processing of both the automatic thrust of the engines and of the elevator. With regards to the automatic thrust of the engines, the pilot knowing that he must climb and also that the nominal speed imposed is below the actual speed of the aircraft must, in accordance with the invention, use the choice element 12 for choosing a particular nominal speed for the addressing of the computer 4 during the first sequence of the process. If it is assumed that the maximum authorized speed for the aircraft is 350 knots, the element 12 can choose a nominal speed of 250 knots which will lead to no discontinuity in the engine thrust and at least not to a transient reduction thereof.

With regards to the elevator, the initial polarization circuit 50 will display a significant nose-up instruction, which will lead to an immediate action either on the elevator via the line 40, or in the case of manual piloting via the instruction 44 which will place the horizontal bar of the flight director in a position which the pilot must correct and maintain in the centre of the dial. Correlatively, the introduction of a new rising gradient in the computer 4 will immediately lead to the latter increasing the engine thrust by supplying an instruction on the line 6. The system remains in this state until the engine thrust has reached its full maximum power.

At this time, the switches 20 and 36 switch and the second sequence of the process commences. With regards to the nominal speed transmitted to the computer 4, it must at this time remain equal to the real nominal speed introduced on the line 22, increased by the five margin knots supplied by the generator 28. The autopilot or manual pilot then controls the trajectory of the aircraft with the aid of the elevator and as a result the conditions of the prior art process are again obtained.

We claim:

1. Process for flying an aircraft, during altitude changes, at a nominal speed within the known performance limits of the aircraft, said aircraft having an engine automation thrust instruction computer, a pilot rule computer and an elevator for autopilot control characterized in that the nominal speed is transmitted in a continuous manner to the engine thrust instruction computer with the process performed during two successive sequences, comprising:

a first sequence during which the elevator only receives an instruction to put the nose up (on climbing) or dive (on descending) and priority is given to said elevator by transmitting to the engine automatic thrust instruction computer a nominal speed equal to or higher than the instantaneous speed of the aircraft on climbing, or equal to or below the instantaneous speed of the aircraft on descending, so that said thrust continuously increases on climbing or continuously decreases on descending until the maximum thrust is obtained in the first case and the minimum thrust in the second and a second sequence, following the first, during which the real nominal speed is supplied to the elevator instruction computer and said same nominal speed, increased (when climbing) or decreased (when descending) by a margin is supplied to the automatic thrust instruction computer.

2. Piloting process according to claim 1, wherein the nominal speed during said first sequence is chosen below the maximum authorized speed and above the minimum authorized speed and at least equal the instantaneous speed of the aircraft if this aircraft is climbing and if the nominal speed is equal to or below said instantaneous speed and when the aircraft is descending and if the nominal speed is above the aircraft speed.

3. Piloting process according to claim 1, wherein during the second sequence the margin by which is increased (when climbing) or decreased (when descending) the value of the nominal speed supplied to the engine thrust is approximately ±5 knots.

4. Piloting process according to claim 1 wherein the engine thrust during the second sequence is reinforced by further increasing thrust on climbing or further decreasing thrust on descending.

5. Piloting process according to claim 2, wherein during the second sequence the margin by which is increased (when climbing) or decreased (when descending) the value of the nominal speed supplied to the engine thrust is approximately ±5 knots.

6. Piloting process according to claim 2, wherein the authority of the engine thrust during the second sequence is reinforced by increasing the gain of the control function of the engine thrust instruction in the thrust increase direction on climbing or thrust decrease direction on descending.

7. Piloting process according to claim 3, wherein during the second sequence the margin by which is increased (when climbing) or decreased (when descending) the value of the nominal speed supplied to the engine thrust is approximately ±5 knots.

* * * * *